United States Patent
Kune et al.

(10) Patent No.: US 11,201,885 B2
(45) Date of Patent: *Dec. 14, 2021

(54) ANOMALY AND MALWARE DETECTION USING SIDE CHANNEL ANALYSIS

(71) Applicant: Virta Laboratories, Inc., Ann Arbor, MI (US)

(72) Inventors: Denis Foo Kune, Saint Paul, MN (US); Benjamin Andrew Ransford, Seattle, WA (US); Daniel Edward Holcomb, Hadley, MA (US); Andrew Whitehouse DeOrio, Ann Arbor, MI (US)

(73) Assignee: VIRTA LABORATORIES, INC., Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/908,045

(22) Filed: Jun. 22, 2020

(65) Prior Publication Data
US 2020/0396236 A1 Dec. 17, 2020

Related U.S. Application Data

(63) Continuation of application No. 15/543,234, filed as application No. PCT/US2016/013298 on Jan. 13, 2016, now Pat. No. 10,693,896.
(Continued)

(51) Int. Cl.
*H04L 29/06* (2006.01)
*H04Q 9/00* (2006.01)
(Continued)

(52) U.S. Cl.
CPC ............ *H04L 63/1425* (2013.01); *G06F 1/28* (2013.01); *G06F 21/56* (2013.01); *H04L 41/06* (2013.01); *H04Q 9/00* (2013.01); *H04L 67/34* (2013.01)

(58) Field of Classification Search
CPC ..... H04L 63/1425; H04L 41/06; H04L 67/34; H04Q 9/00; G06F 21/56; G06F 1/28
See application file for complete search history.

(56) References Cited

U.S. PATENT DOCUMENTS 5,165,098 A 11/1992 Hoivik
6,804,782 B1 10/2004 Qiu et al.
(Continued)

FOREIGN PATENT DOCUMENTS

EP 3 384 244 10/2018
EP 3 384 390 10/2018
(Continued)

OTHER PUBLICATIONS

Baig, Zubair, On the Use of Pattern Matching for Rapid Anomaly Detection in Smart Grid Infrastructures, Oct. 2011, IEEE International Conference on Smart Grid Communications pp. 214-219 (Year: 2011).*
(Continued)

*Primary Examiner* — Kenneth W Chang
(74) *Attorney, Agent, or Firm* — Foley & Lardner LLP

(57) ABSTRACT

The present disclosure describes systems and methods for detecting malware. More particularly, the system includes a monitoring device that monitors side-channel activity of a target device. The monitoring device that can work in conjunction with (or independently of) a cloud-based security analytics engine to perform anomaly detection and classification on the side-channel activity. For example, the monitoring device can calculate a first set of features that are then transmitted to the security analytics engine for anomaly detection and classification.

20 Claims, 3 Drawing Sheets

Related U.S. Application Data

(60) Provisional application No. 62/103,482, filed on Jan. 14, 2015.

(51) Int. Cl.
  *G06F 21/56* (2013.01)
  *G06F 1/28* (2006.01)
  *H04L 12/24* (2006.01)
  *H04L 29/08* (2006.01)

(56) References Cited

U.S. PATENT DOCUMENTS

| | | | |
|---|---|---|---|
| 9,886,583 B2 | 2/2018 | Aguayo Gonzalez et al. | |
| 2008/0276111 A1 | 11/2008 | Jacoby et al. | |
| 2009/0281679 A1* | 11/2009 | Taft | G01D 4/004 |
| | | | 700/297 |
| 2010/0280774 A1* | 11/2010 | Ewing | H04Q 9/00 |
| | | | 702/60 |
| 2010/0301873 A1 | 12/2010 | Nobukata | |
| 2010/0313270 A1* | 12/2010 | Kim | G06F 21/552 |
| | | | 726/24 |
| 2010/0322298 A1 | 12/2010 | Hisakado et al. | |
| 2011/0184575 A1 | 7/2011 | Kawamoto et al. | |
| 2012/0143387 A1 | 6/2012 | Indovina et al. | |
| 2013/0304266 A1 | 11/2013 | Giannakis et al. | |
| 2014/0062441 A1* | 3/2014 | Butler | H02M 5/293 |
| | | | 323/282 |
| 2014/0157013 A1* | 6/2014 | El-Essawy | H05K 7/1498 |
| | | | 713/300 |
| 2014/0201208 A1 | 7/2014 | Satish et al. | |
| 2014/0266755 A1* | 9/2014 | Arensmeier | F24F 11/62 |
| | | | 340/679 |
| 2016/0012411 A1 | 1/2016 | Kursun et al. | |
| 2017/0161485 A1 | 6/2017 | Aguayo Gonzalez et al. | |
| 2018/0011130 A1 | 1/2018 | Aguayo Gonzalez et al. | |

FOREIGN PATENT DOCUMENTS

| | | |
|---|---|---|
| WO | WO-2010/141826 A2 | 12/2010 |
| WO | WO-2012/054339 A1 | 4/2012 |
| WO | WO-2016/190931 | 12/2016 |
| WO | WO-2018/009510 | 1/2018 |

OTHER PUBLICATIONS

Final Office Action on U.S. Appl. No. 15/543,234 dated Sep. 25, 2019.

International Search Report and Written Opinion for International Appl. No. PCT/CN2016/013298, dated Apr. 5, 2016.

International Search Report and Written Opinion for International Appl. No. PCT/CN2016/013298, dated Jul. 27, 2017.

Non-Final Office Action on U.S. Appl. No. 15/543,234 dated Mar. 6, 2019.

Notice of Allowance on U.S. Appl. No. 15/543,234 dated Mar. 6, 2020.

\* cited by examiner

ANOMALY AND MALWARE DETECTION USING SIDE CHANNEL ANALYSIS

CROSS-REFERENCE TO RELATED APPLICATIONS

This application is a continuation of and claims priority to U.S. patent application Ser. No. 15/543,234, filed Jul. 12, 2017, and entitled "ANOMALY AND MALWARE DETECTION USING SIDE CHANNEL ANALYSIS", which itself is a U.S. National Stage of International Application No. PCT/US2016/013298 filed on Jan. 13, 2016, which in turn claims priority to U.S. Provisional Patent Application No. 62/103,482 filed on Jan. 14, 2015. The foregoing applications are hereby incorporated herein by reference in their entirety.

BACKGROUND OF THE DISCLOSURE

Computers and embedded systems, such as medical devices, are increasingly connecting to the Internet. The connection of these devices can expose the devices to malware or other malicious code. Many devices are incompatible with anti-malware software because, for example, the devices run custom firmware. Other devices may be computationally capable of running anti-malware software; however, manufactures may forbid end users from installing updates or anti-malware software on the device. For example, the manufacture may only certify a device's safety or reliability as long as the end user does not modify the device by installing third-party software (which includes anti-malware software).

SUMMARY OF THE DISCLOSURE

The present disclosure describes systems and methods for monitoring target devices for malicious activity. The system can include a hardware monitoring device that can work in conjunction with (or independently of) a cloud-based security analytics engine. The system can detect and process anomalies and malware in target devices, which traditionally cannot be monitored by anti-virus software. Installed external to the target device, the system can monitor the activity of the target device by analyzing side-channel phenomena such as, but not limited to, power consumption of the target device. Unlike traditional anti-virus software that may interfere with normal operations and require updates, side-channel analysis can be independent of the software running on the target device.

In some implementations, the system processes side-channel data continuously on a local device and/or a cloud-based server. The server can run a machine-learning engine and integrate multiple data sources to reliably detect malicious activity.

According to one aspect of the disclosure, a method for anomaly detection includes receiving, by one or more data processors, an input signal that includes a plurality of samples. Each of the plurality of samples represent a power consumption level of a target device at a given time. The method also includes storing, by the one or more data processors, the plurality of samples as a data structure in a memory element coupled to the one or more data processors. The method also includes retrieving, by the one or more data processors, a subset of the plurality of samples from the data structure. The method also includes calculating, by the one or more data processors, a feature sample for the subset of the plurality of samples, and transmitting the feature sample to a remote server. The method also includes receiving, by the one or more data processors and from the remote server, a classification of the feature sample, and then generating, by the one or more data processors, an alarm signal responsive to the classification of the feature sample indicating an anomaly.

In some implementations, the method also includes receiving the input signal from a current sensor, such as a current sense resistor, a current transformer, or a Hall effect sensor. The method can also include calculating a frequency content for the subset of the plurality of samples in each of a plurality of frequency bins. In some implementations, the frequency content is calculated for a range between about 0 Hz and about 200 kHz or between about 0 Hz and about 500 Hz. The method can include calculating the feature sample for at least one of the plurality of frequency bins.

In some implementations, a frequency bin can be between 0 Hz and about 1 Hz, between about 0 Hz and about 200 kHz, between about 0 Hz and about 500 Hz, between about 1 Hz and about 1 kHz, or between about 1 kHz and about 200 kHz.

The method can also include calculating a Fourier transform of the subset of the plurality of samples. The method can include calculating at least one of a mean, a standard deviation, a skew, and a kurtosis of the subset of the plurality of samples. The method can also include calculating an aggregate power consumption of the target device over the subset of the plurality of samples.

The anomaly can include at least one of a computer virus, a worm, a trojan horse, a ransomware, a spyware, an adware, and a scareware executing on the target device. The anomaly can also include unusual hardware or peripheral behavior such as high microprocessor usage.

According to another aspect of the disclosure, a monitoring device includes a pass-through power circuit with an inlet and an outlet, a current sensor configured to generate a signal corresponding to an amount of current flowing through the pass-through power circuit, and one or more data processors. The one or more data processors are configured to convert the signal into a plurality of samples. Each of the samples represent a level of current flowing into a target device at a given time. The one or more data processors are also configured to store the plurality of samples as a data structure in a memory element that is coupled to the one or more data processors. The one or more data processors are also configured to retrieve a subset of the plurality of samples from the data structure stored in the memory element. The one or more data processors are also configured calculate a feature sample of the subset of the plurality of samples, and transmit the feature sample to a remote server. The one or more data processors are also configured to receive from the remote server a classification of the feature sample, and then generate an alarm signal.

In some implementations, the current sensor can include one of a current sense resistor, a current transformer, and a Hall effect sensor. The one or more data processors can also be configured to calculate a frequency content for the subset of the plurality of samples in each of a plurality of frequency bins. The one or more data processors can also be configured to calculate the feature sample for at least one of the plurality of frequency bins. A frequency bin can be between 0 Hz and about 1 Hz, between about 0 Hz and about 200 kHz, between about 0 Hz and about 500 Hz, between about 1 Hz and about 1 kHz, or between about 1 kHz and about 200 kHz.

The one or more data processors can also be configured to calculate a Fourier transform of the subset of the plurality of samples. The feature sample can include at least one of a mean, a standard deviation, a skew, and a kurtosis of the subset of the plurality of samples. The feature sample can include an aggregate power consumption of the target device over the subset of the plurality of samples.

According to another aspect of the disclosure, a computer readable medium stores processor executable instructions thereon. The instructions, when executed by one or more data processors, cause the one or more data processors to receive an input signal. The input signal can include a plurality of samples. Each of the plurality of samples representing a power consumption level of a target device at a given time. The instructions can also cause the one or more data processors to store the plurality of samples as a data structure in a memory element coupled to the one or more data processors. The instructions can also cause the one or more data processors to retrieve a subset of the plurality of samples from the data structure. The instructions can also cause the one or more data processors to calculate a feature sample for the subset of the plurality of samples, and transmit the feature sample to a remote server. The instructions can also cause the one or more data processors to receive a classification of the feature sample, and generate an alarm signal responsive to the classification of the feature sample indicating an anomaly.

The instructions can further cause the one or more data processors to calculate a frequency content for the subset of the plurality of samples in each of a plurality of frequency bins.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
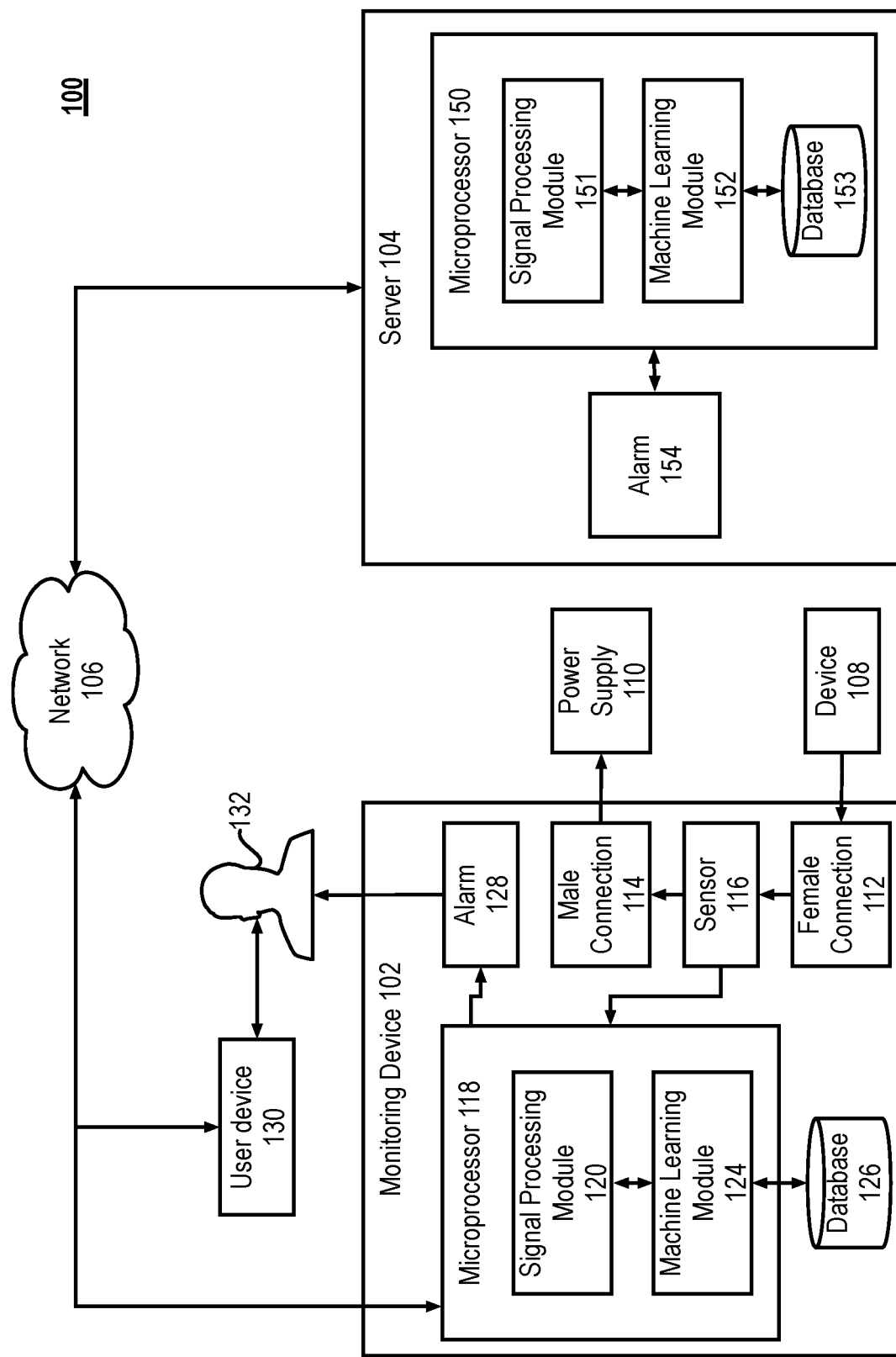
FIG. 1 illustrates an example system for detecting malware or other unapproved or malicious software running on a target device.

FIG. 1 illustrates an example system 100 for detecting malware or other unapproved or malicious software running on a target device. The system 100 includes a monitoring device 102 connected to a server 104 through a network 106. The system 100 also includes a target device 108 that is monitored for the malware by the monitoring device 102. The target device 108 is connected to a power supply 110 through the monitoring device 102. The monitoring device 102 includes a female connection 112 to which the target device 108 is connected. There is a pass through connection within the monitoring device 102 that connects the female connection 112 to the male connection 114, which is connected to the power supply 110 and in turn provides power to the target device 108. The monitoring device 102 includes a sensor 116 that monitors the power consumption of the target device 108. The sensor 116 transmits the power consumption data to a microprocessor 118. The microprocessor 118 includes a signal processing module 120, a machine learning module 124, and a database 126. The monitoring device 102 also includes an alarm 128. The server 104 of the system 100 also includes one or more microprocessors 150, a signal processing module 151, a machine learning module 152, a database 153, and an alarm 154. A user device 130, which is used by a user 132, is also connected to the network 106.

The system 100 includes the target device 108. The target device 108 can be any computer or device that includes one or more processors and is capable of executing processor executable instructions. For example, the target device 108 can include a medical device, process-control system, retail point-of-sale terminal, industrial supervisory control and data acquisition (SCADA) systems, or embedded system. In some implementations, the target device 108 is monitored for malware because the target device 108 can execute processor executable instructions such as programs and malware; however, is not capable of running (or for policy reasons is not allowed to run) anti-virus software, software patches, or software updates. For example, because of validation and regulatory requirements medical devices may not be updated by the end user after deployment into the field. The malware executed by the target device 108 can include, but is not limited to, computer viruses, worms, trojan horses, ransomware, spyware, adware, scareware, and other malicious programs. The anomaly can also include unusual hardware or peripheral behavior such as high microprocessor usage. In some implementations, the malware is not a malicious program, but a non-malicious program that is unapproved to be installed on the target device 108—for example, the monitoring device 102 may monitor the target device 108 for personal software installed on a corporate target device 108. The execution of any of these malicious or non-malicious programs can be registered by the monitoring device 102 as an anomaly.

The system 100 also includes the monitoring device 102. The monitoring device 102, and the components thereof, is described in greater detail below, but in general the monitoring device 102 is a nonintrusive monitoring system that can monitor and analyze out-of-band side channels to determine if the target device 108 is running malicious software. In some implementations, the side channel is power consumption and the monitoring device 102 analyzes the aggregate power consumption of the target device 108 to detect and classify activity that deviates from a standard behavior. The monitoring device 102 can also monitor other side channels such as, but not limited to, electromagnetic and acoustic emissions. The monitoring device 102 can be a component of the target device 108 or can be interposed between the target device 108 and the power supply 110. The monitoring device 102 can also run a secure communication stack that enables the monitoring device 102 to communicate and offload a portion (or all) of the computational requirements to the server 104. For example, an initial analysis of the target device's power consumption may be performed on the monitoring device 102 and when an anomaly is detected, the signal collected by the monitoring device 102 may be sent to the server 104 for further or detailed analysis. In some implementations, the monitoring device 102 collects data from the target device 108, substantially all of which is sent to the server 104 for analysis. In other implementations, the monitoring device 102 can collect data from the target device 108 and perform a first series of feature calculations on the data (e.g., filtering, fast Fourier transform calculations, and calculating the variance and RMS of the power consumption) and offload a portion of the analysis (e.g., the classification) to the server 104. Once the monitoring device 102 performs the first series of calculations to calculate feature samples, the calculated feature samples may then be transmitted to the server 104 for analysis. Sending only the calculated feature samples to the server 104 can consume substantially less bandwidth when compared to sending the full, original data signal to the server 104. In these implementations, the server 104 may perform a classification analysis on the received feature samples, and responsive to detecting an anomaly temporarily request the full, original data signal (or a downsampled version thereof) from the monitoring device 102. In yet other implementations, the feature calculation and malware classification can be performed on the monitoring device 102 without transmitting data back to the server 104 for further analysis.

The monitoring device 102 can include a pass-through power circuit that enables power to pass from a wall outlet and then through the monitoring device 102 and to the target device 108. The pass-through power circuit can include a female connection 112 to which the target device 108 is connected. The female connection 112 can be a female NEMA-5 connector or equivalent AC outlet connector. The power cord of the target device 108 can be plugged directly into the female connector 112. The pass-through circuit of the monitoring device 102 also includes a male connector 114, such as a male NEMA-5 connector or equivalent AC outlet connector. The male connector 114 may be an electrical plug on the end of a power cable that can be connected to a wall outlet. The pass-through power circuit creates a path that enables power from the power supply 110 to travel through the monitoring device 102 to the target device 108. The power supply 110 can be an AC wall outlet or a DC power source (e.g., a battery). In some implementations, the monitoring device 102 can be a component of the target device 108. For example, the monitoring device 102 may be a component hardwired to a power supply within the target device 108.

The monitoring device 102 can include one or more sensors 116 that can detect and monitor the current flowing between the female connector 112 and the male connector 114, and thus the power consumption of the target device 108. In some implementations, the monitoring device 102 can include a plurality of sensors 116, some of which may not monitor the current flowing through to the monitoring device 102. For example, the sensor 116 can be an acoustic or an electromagnetic sensor. In some implementations, when monitoring the power consumption of the target device 108, the sensor 116 can be a Hall effect sensor or a current transformer. The Hall effect sensor can generate a voltage that is proportional to the magnetic field generated as current flows through the monitoring device 102. The signal (e.g., the voltage signal) generated by the sensor 116 is received by the microprocessor 118 where the signal can be converted from an analog signal to a digital signal that includes a plurality of samples representing a level of current (or power) flowing into the target device 108 at a given time.

In some implementations, the monitoring device 102 can include multiple pass-through power circuits and multiple sensors 116. For example, the monitoring device 102 can be configured as a surge protector with a plurality of female connections 112. This example configuration can enable multiple target devices 108 to be plugged into a single monitoring device and be simultaneously monitored.

The microprocessor 118 of the monitoring device 102 can be one or more data processors or microcontrollers capable of executing processor executable instructions. The microprocessor 118 can include special purpose logic circuitry, such as application-specific integrated circuits (ASICs), digital signal processors (DSPs), field-programmable gate arrays (FPGAs), general purpose microprocessors, or a combination thereof. In one example, the microprocessor 118 can be a 120 MHz ARM Cortex M4 microcontroller manufactured by Texas Instruments. The microprocessor 118 can include on-chip memory (e.g., 256 KB of on-chip SRAM) and/or be coupled to off-chip memory (e.g., 256 MB of off-chip SDRAM). The database 126 can be stored in the on-chip or the off-chip memory of the monitoring device 102. The microprocessor 150 of the server 104 can be the same as or different than the microprocessor 118 and can perform each of the functions described herein in relationship to the microprocessor 118. In some implementations, the microprocessor 150 includes greater computational power when compared to the microprocessor 118.

The signal processing module 120 and the machine learning module 124 may include applications, programs, libraries, services, tasks or any type and form of executable instructions executable by the monitoring device 102. The signal processing module 151 and the machine learning module 152 may include applications, programs, libraries, services, tasks or any type and form of executable instructions executable by the monitoring device 102. The signal processing module 151 and the machine learning module 152 can include any of the functions described herein in relation to the signal processing module 120 and the machine learning module 124 to enable portions of the calculations and processing described herein to be offloaded from the monitoring device 102 to the server 104. The executable instructions can be stored in the database 126, database 153, or other form of memory element. In some implementations, the signal processing module 120 is configured to receive an input signal from the sensor 116 which indicates the present power consumption of the target device 108. The signal processing module 120 may process the input signal with an analog to digital converter to generate a plurality of samples representing the power consumption level of the target device 108 at a given time. The input signal may be sampled between about 500 Hz and about 1 MHz, between about 1 kHz and about 500 kHz, between about 1 kHz and about 200 kHz, or between about 50 kHz and about 100 kHz. The sampling frequency can be constant or vary with time. For example, the monitoring device 102 may sample the input signal at a higher sampling rate responsive to detecting an anomaly. In other implementations, the signal processing module 120 may receive an input signal from an analog to digital converter that is external to the microprocessor 118. For example, the monitoring device 102 may include separate analog to digital circuitry that conditions (e.g., filters) a signal from the sensor 116 and then digitizes the signal before sending the digitized signal to the signal processing module 120 of the microprocessor 118. The microprocessor can store the samples of the digitized power consumption level signal into a data structure in the database 126. The database 126 can be stored in a memory element, such as a solid state drive, flash drive, or other form of volatile or non-volatile memory. The data structure, can for example, indicate a time at which each of the samples were recorded.

The signal processing module 120 can be configured to condition the input signal and calculate time domain and/or frequency domain features on the input signal. Conditioning the input signal can include filtering the input signal. The signal processing module 120 may be configured to analyze substantially the entire spectral range of the input signal, such as between about 0 Hz and about 200 kHz. In other implementations, the signal processing module 120 may analyze specific frequencies (or bins) over time. For example, the signal processing module 120 may process the input signal to generate a power spectral density of the 60 Hz, or other frequency components of the input signal over time. Other bins can include ranges such as between 0 Hz and about 1 Hz, between about 0 Hz and about 200 kHz, between about 0 Hz and about 500 Hz, between about 1 Hz and about 1 kHz, or between about 1 kHz and about 200 kHz.

In some implementations, the relatively low-frequency components, relatively mid-frequency components, and relatively high-frequency components of the input signal are analyzed separately. Analysis of the relatively low-frequency components can be useful in detecting periodic anomalous activity, such as RAM scrapers. Analysis of the relatively mid-frequency components can be useful in detecting activity in the 60 Hz sidebands or the presence of processor computations, and analysis of the relatively high-frequency components can be useful for detecting changes in the power consumption of the target device's processor. In some implementations, the relatively low-frequency component includes frequencies from about 0 Hz to about 1 Hz, the relatively mid-frequency component includes frequencies from about 1 Hz to about 120 Hz, between about 0 Hz and about 500 Hz, or between about 1 Hz to about 1 kHz, and the relatively high-frequency component includes frequencies from about 1 kHz to about 200 kHz.

The signal processing module 120 can calculate time domain and frequency features. The time domain and frequency features calculated by the signal processing module 120 can include, but are not limited to, root mean square, minimums, maximums, means, variance, skew, Kurtosis, discrete Fourier transforms (DFT), and interquartile interval. In some implementations, the features are calculated on a portion (e.g., a window) of the input signal. One or more of the calculated features of the input signal can be provided to the machine learning module 124 for anomaly detection and classification. The features can be provided to a machine learning module 124 on the monitoring device 102 and/or the machine learning module 152 on the server 104.

In some implementations, the signal processing module 120 provides the machine learning module with specific frequency domain features between about 0 Hz to about 200 kHz, between about 0 Hz and about 100 kHz, between about 0 Hz and about 1000 Hz, or between about 0 Hz and about 500 Hz. In some implementations, the features of the input signal are calculated within a moving window. For example, the signal processing module 120 can retrieve a subset of the stored data samples form the database 126 and analyze the retrieved subset of data samples. The signal processing module 120 can then receive a second subset of the stored data samples from the database 126 for analysis. The window (e.g., the time span of the retrieved subset of samples) can have a width of between about 0.5 seconds and about 10 seconds, between about 1 second and about 5 seconds, or between about 2 and about 5 seconds. The windows can have no overlap, an overlap between about 20% and about 80%, or an overlap between about 35% and about 65%. In some implementations, the monitoring device 102 can be configured to not perform calculations on the input signal and transmit the entire input signal to the server 104 for analysis.

In other implementations, the calculation of features can be made by the monitoring device 102 and then calculated features can be transmitted to the server 104 to reduce the bandwidth requirements when compared to sending the full input signal to the server 104. For example, if the monitoring device 102 samples the power consumption signal at 100 kSamples/second and each sample is 16 bits, 1.6 Mbits (or 200 kB) would need to be transmitted to the server 104 per second if the full input signal was to be transmitted. In contrast, if the input signal is binned into $2^{10}$ bins and 13 features are calculated (with each feature being 16 bits), the amount of data that would need to be transferred per second would be about $(2^{10}+13)*16=2.074$ kB, or about a 100 times reduction in the amount of data transmitted to the server 104.

The features calculated by the signal processing module 120 can be passed to the machine learning module 124. The machine learning module 124 can include an anomaly detector that detects anomalies, by, for example, detecting when one or more features crosses a threshold. The machine learning module 124 can also include a classifier module that classifies the detected anomaly.

The anomaly detector module of the machine learning module 124 can automatically set the threshold, which when crossed indicates to the anomaly detector module that an anomaly has occurred if the distribution is assumed to be known. Example probability distributions include Gaussian, Log-Normal, exponential and Poisson. In some implementations, the probability distribution can be any distribution with a thinning tail. For example, for a multi-dimensional feature set with a Gaussian distribution, the monitoring device 102 can be trained with normal behavior. The anomaly threshold can then be set as a given distance from the mean (e.g. 4 standard deviations) or the threshold can be set as a given level on the density function (e.g. the reading is in a region where the instantaneous value of the probability density function is below the threshold). In some implementations, this method scales to multi-dimensional matrices. With between 20 and 30 features, the system can be trained in under 5 minutes using several hours of data. In some implementations, to compensate for different noise levels, if a potential anomaly is detected, the signal from a known malware can be subtracted from the potential anomaly. The resulting signal can then be reprocessed with the anomaly detection. If the resulting signal does not appear anomalous, it is likely that the malware signal used is the type of malware present in the tested anomaly.

The machine learning module 124 can also include a classifier module that can classify the detected anomaly as malware or a variant thereof. The classifier can be a random forest, support vector machine (SVM) with a linear kernel or radial basis function (RBF), logistic regression, naïve Bayes, or a neural network. In some implementations, anomaly detection is made using a first set of features and the classification is made using a second set of features. For example, RMS and variance can be used for anomaly detection and then the FFT can be used for classification. When using DFT for classification with 1024 bins for a signal at 10 kHz. Some or all of the bins may be used in the anomaly detection. For example, bins 0 to about 500 may be used.

As described above, the signal processing module 151 and the machine learning module 152 may be configured the same as or differently than the signal processing module 120 and the machine learning module 124. As an example where the signal processing module 151 and the machine learning module 152 are configured differently than the signal processing module 120 and the machine learning module 124, the signal processing module 151 and the machine learning module 152 may be configured to receive data from a plurality of monitoring devices 102 and make classifications based on the data from the plurality of monitoring devices 102 while the signal processing module 120 and the machine learning module 124 may be configured to only process data generated by the monitoring device 102.

Still referring to FIG. 1, the monitoring device 102 and server 104 also include alarm 128 and 154, respectively. The alarms 128 and 154 can be configured to notify the user 132 when malware is detected on the target device 108. The alarm 128 can be a programmatic alarm and/or an audio/visual alarm. As an example of a programmatic alarm, responsive to the detection of malware on a target device 108, the alarm can include applications, programs, libraries, services, tasks or any type and form of executable instructions that when executed cause an electronic notification to be sent to the user device 130 via the network 106. For example, the electronic notification can be an email, text message, email, push notification, submission to a log-aggregation tool or security information and event management (STEM) tool, or a combination thereof. As an example of an audio/visual alarm, the monitoring device 102 can include a screen, lights (e.g., LEDs), or a speaker that can be used to notify the user 132 if malware is detected on the target device 108. For example, responsive to the detection of malware on the target device 108, the monitoring device 102 can light up a red LED warning light on the housing of the monitoring device 102 and may also generate an audible alert that can notify the user 132 that malware was detected. In some implementations, the server 104 is located remotely to the user device 130 and the 132. In these implementations, the alarm 154 can be a programmatic alarm and communicates with the user device 130 via the network 106.

Referring to FIG. 1, the system 100 also includes the server 104. The server 104 can be connected, through the network 106, to one or more monitoring devices 102. As an overview, the server 104 can be configured to perform all or more of the processing functions performed by the monitoring device 102, and described herein. In some implementations, the processing of the input signal generated by the sensor 116 can be split between the server 104 and the monitoring device 102. In some implementations, the monitoring device 102 is resource constrained and may perform computations that are less computationally intensive while the server 104 performs operations that are more computationally intensive because the server 104 is not resource constrained. In some implementations, where the input signal is analyzed is also dependent on the latency to the server, available network bandwidth, load average on the monitoring device 102, availability of the server 104, or a combination thereof. For example, during times of low network traffic, the monitoring device 102 may take advantage of the low demands on the network 106 and offload more of the computations to the server 104. Conversely, during times of high network traffic, the monitoring device 102 may reduce its demands on the network 106 by sending less data to the server 104 and performing more of the computational work on the monitoring device 102. In some implementations, the network 106 may include a load balancer, which effectively distributes computational work from a plurality of power monitors 102 to a plurality of servers 104. The load balancer efficiently connects each monitoring device 102 to a server 104 to prevent over provisioning and bottlenecks within the servers 104 and network 106.

In some implementations, the server 104 can control the function of the monitoring device 102. For example, the monitoring device 102 can sample the input signal at a variable rate. As an example, in a default sampling rate the monitoring device 102 may sample the input signal at less than 5 kHz and perform feature calculations on the low sampled data. The monitoring device 102 may then send the calculated features to the server 104 for anomaly detection and classification by the machine learning module 152 of the server 104. Responsive to the server 104 detecting the calculated features of the low sampled data crossing a predetermined threshold, the server 104 can send a signal to the monitoring device 102 to instruct the monitoring device 102 to increase the sampling rate (to, for example, between 10 kHz and 200 kHz) and send the highly sampled data to the server 104 for analysis. The server 104 may then perform additional calculations such as a DFT analysis, anomaly detection, and malware classification. In some implementations, the monitoring device 102 can remain sampling at the higher sampling rate and transmitting the highly sampled data to the server 104 as long as the server 104 determines that one or more features are above a predetermined threshold. When the server 104 determines that the one or more calculated features are no longer above the predetermined threshold, the server 104 can send the monitoring device 102 a message indicating that the monitoring device 102 should return to the default sampling rate. In other implementations, the monitoring device 102 may continue sampling at the high sampling rate for a predetermined amount of time after the detection of a threshold crossing by the monitoring device 102. For example, the monitoring device 102 may sample at a higher rate for 10 minutes after the detection of a threshold crossing.

In some implementations, the server 104 can configure the monitoring device 102 at times in addition to the detection of anomalies. For example, the server 104 may instruct the monitoring device 102 to increase its sampling rate at specific times such as when the server 104 or network 106 have available bandwidth. In another example, the server 104 may request a higher sampled input signal from a monitoring device 102 that the server 104 knows to be connected to a malware-free (e.g., "clean") target device 108 such that the server 104 can compare the higher sampled input signal from the clean target device 108 to a higher sampled input signal that the server 104 believes may be infected with malware.

Referring to FIG. 1, the system 100 also includes the network 106 over which the components of the system 100 can communicate. The network 106 may be a collection of wired and/or wireless links, such a local and wide area networks, fiber optic networks, coaxial cable networks, infrared networks, satellite networks, Wi-Fi networks, and cellular networks. The topology of the network 106 may be of any form and may include, e.g., any of the following: point-to-point, bus, star, ring, mesh, or tree. The network 104 may be an overlay network which is virtual and sits on top of one or more layers of other networks. The network 106 may utilize different techniques and layers or stacks of protocols, including, e.g., the Ethernet protocol, the internet protocol suite (TCP/IP or UDP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, security layer (e.g., VPN), transport layer, internet layer (including, e.g., IPv6), or the link layer. The network 106 may be a type of a broadcast network, a telecommunications network, a data communication network, or a computer network.

Figure 2:
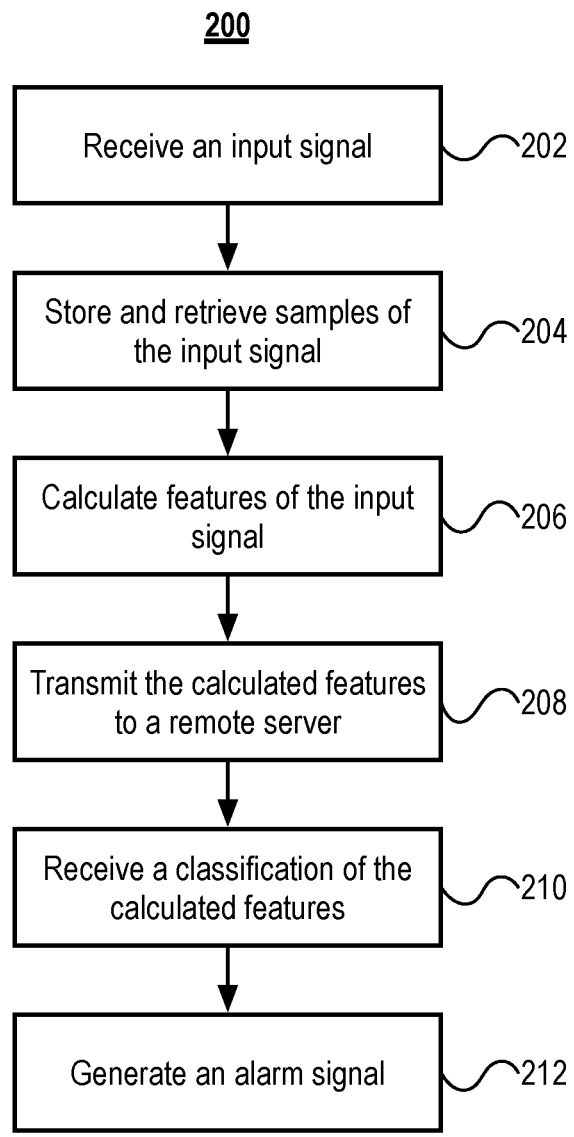
FIG. 2 illustrates flow chart of an example method of detecting malware on a target device using the system illustrated in FIG. 1.

FIG. 2 illustrates a flow chart of an example method 200 of detecting malware on a target device. The method 200 includes receiving an input signal (step 202). The method 200 can also include storing the input signal and retrieving a subset of samples of the input signal (step 204). The method 200 can also include calculating features of the input signal (step 206). The calculated features can then be transmitted to a remote server (step 208). An indication of a classification of the calculated features can be received from the remote server (step 210). The method 200 can also include generating an alarm signal (step 212).

As set forth above, the method 200 includes the monitoring device receiving an input signal (step 202). The input signal can be an analog signal that is converted into a digital signal or the monitoring device can receive an input signal that was previously digitized. The digitized input signal includes a plurality of samples. Each of the samples represent a power consumption level of a target device at a given time. The target device can be a computer or other device capable of executing processor executable instructions (e.g., malware). The power consumption can be monitored with a monitoring device that is connected inline between the target device and a power source, such as a wall outlet. As the target device consumes power, the monitoring device can measure the amount of power consumed with an onboard sensor (e.g., a Hall effect sensor) and generate the input signal. In some implementations, the monitoring device may monitor other forms of side-channel signals such as electromagnetic or acoustical. In some implementations, the monitoring device can sample the power consumption of the target device at either 1 kHz, 50 kHz, 100 kHz, or 200 kHz.

The method 200 can also include storing and retrieving samples of the input signal (step 204). The incoming samples of the input signal can be stored as a data structure in a memory element of the monitoring device. The one or more microprocessors of the monitoring device can then retrieve a subset of the plurality of samples from the data structure. For example, the monitoring device may calculate feature samples for windows of the input signal. The retrieved subset of the samples can correspond to the samples in the window to be analyzed. In some implementations, the samples are stored in a long term memory element for retrieval at a later time, and in other implementations the samples can be stored in a short term memory element such as a rolling buffer.

The method 200 can also include calculating a feature sample of the retrieved samples (step 206). More than one feature sample can be calculated for the retrieved samples, and the features can include time or frequency domain features. For example, the features can include the root mean square, minimum, maximum, mean, variance, skew, kurtosis, interquartile interval, and discrete Fourier transform, or a combination thereof. In some implementations, when calculating a Fourier transform, the transform is calculated with a window size between about 1 second and about 100 seconds, wherein the windows have between about a 25% and about an 80% overlap. In some implementations, the window size and overlap are responsive to the sampling rate of the input signal. For example, a 200 kHz signal may be binned into 4096 bins and a 5 second window with 80% overlap may be used. For a 1 kHz signal, the signal may be binned into 1024 bins and 2 second window with a 50% overlap may be used.

Figure 3A:
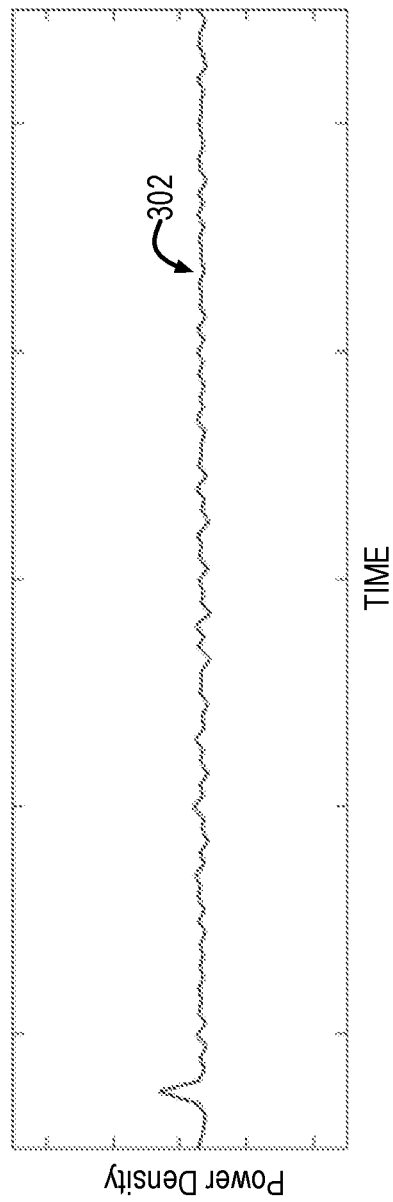
FIGS. 3A and 3B illustrate a graph of the amplitude of a 60 Hz frequency signal over time captured with a system similar to the system illustrated in FIG. 1.
Figure 3B:
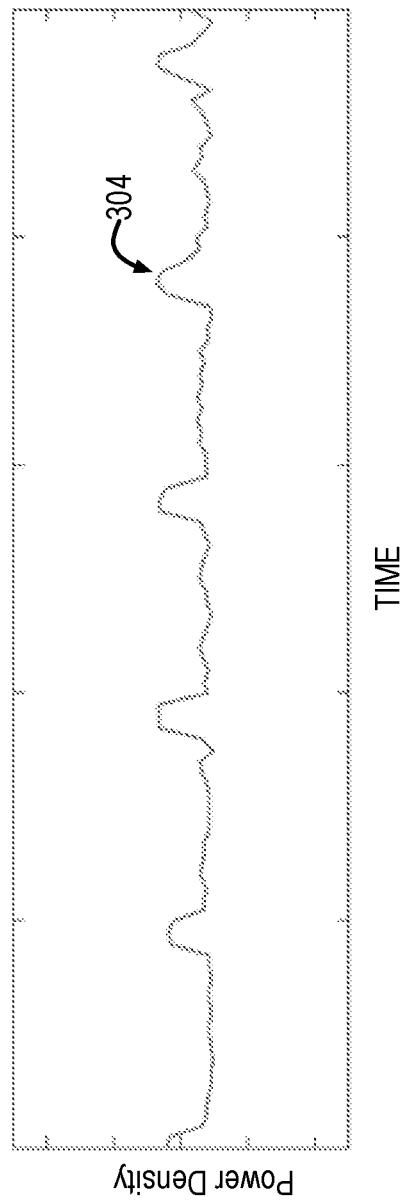

As an example of calculating a plurality of feature samples, FIGS. 3A and 3B each illustrate a graph of the amplitude of a 60 Hz frequency signal over time. FIG. 3A illustrates the 60 Hz frequency signal 302 when the target device is idle. FIG. 3B illustrates the 60 Hz frequency signal 304 when the target device is infected with a RAM scraper. The graphs were generated by digitizing the input signal. The input signal was windowed by iteratively retrieving subsets of the samples of the input signal. The frequency content of the windowed input signal was divided into a plurality of frequency bins, and the bin containing the 60 Hz signal was plotted as the graphs illustrated in FIGS. 3A and 3B. As illustrated in FIG. 3B, there are noticeable rises in the 60 Hz frequency signal 304 when the CPU is actively scanning the active memory. The 60 Hz signal can act as a proxy for the amount of power consumed by the CPU of the target device. The 60 Hz signal can be a robust metric that survives many filters on the power line between the target device processor and the wall outlet.

The method 200 can also include transmitting the calculated features to a remote server (step 208). As described above in relation to FIG. 1, the calculated features can be transmitted to the remote server, where the features are analyzed for the presence of anomalies. Any detected anomalies can be classified as caused by a specific category of malicious or non-malicious program executing on the target device. In some implementations, the anomaly detection and malware classification is performed on the monitoring device, which is local to the target device. The anomaly detection and malware classification can be conducted by a machine learning module of the remote server (or monitoring device if the analysis is conducted locally). In some implementations, the anomaly detection and malware classification can run in parallel and in other implementations the anomaly detection and malware classification can be pipelined, with the anomaly detection occurring first, followed by the classification of any detected anomalies. When in a pipeline configuration, if the anomaly detector of the machine learning module detects an anomaly the signal is passed to the classifier and the classifier determines the type of malware present on the target device.

In some implementations, both the anomaly detection and classifier modules of the machine learning module use a supervised training method. In these implementations, the machine learning module is trained with a set of known "clean data" on site (for the anomaly detection) after being connected to the target device and a set of known malware behavior (for the classifier) prior to being connected to the target device. For example, the monitoring device may come pre-installed with a database of known malware. After training, the machine learning module can switch into an online detection mode where incoming features are compared against the training set to determine if the features (1) appear within the normal parameters and (2) if anomalous features are found, what is the most likely cause, including malware and variants thereof. In some implementations, the system is trained onsite and in other implementations the system can be trained prior to deployment. In some implementations, the system can be retrained after deployment.

For example, identification of new malware can be crowd sourced among deployed monitoring devices. If a target device monitored by a monitoring device is determined to have a new piece of malware, the information can be sent to a central server where it can then be incorporated into the training databases of the deployed machine learning modules.

Referring again to the example illustrated in FIGS. 3A and 3B, the remote server can receive the features calculated by the monitoring device that represent the amplitude changes in the 60 Hz frequency signals. In some implementations, the machine learning module may wait and classify signals representing predetermined amounts of time. For example, the machine learning module may generate a classification for every 10 seconds, 1 minute, 5 minutes, 10 minutes, 30 minutes, 1 hour, 2 hours or more of incoming feature samples. In some implementations, the machine learning module may identify peaks in the 60 Hz signal (e.g., periods when the 60 Hz signal crosses a predetermined threshold). The machine learning module can also calculate the $1^{st}$ differential of the 60 Hz amplitude signal, which provides spikes when the amplitude is increasing, flat lines when there is no change in amplitude, and dips when the amplitude decreases. The mean height of those peaks, the mean distance of the flat 1st differential between a peak and a dip, and the mean depth of a dip can be calculated. A peak can be represented as a "0," a flat distance as a "1," and a dip as a "2". If one character is provided per second, a signal that shows the 60 Hz amplitude increasing, then holding high for 3 seconds, then going back to normal, produces the string "01112."

Having generated the character string "01112," the character string is processed by the machine learning module, which can, for example, run a finite state machine, Hamming distance, or Jaccard distance to recognize patterns of peaks, followed by flat lines and then a dip. A standard deviation of the distance between peaks and dips can be added to state changes to add tolerance for jitter in the signal.

The machine learning module can also calculate a Fourier transform of the 60 Hz line and then compute a period of the 60 Hz line to determine if anomalies are present. For example, the machine learning module can detect periods of 60 Hz line activity that can correspond to the RAM scraping malware or the intermittent activity of other malware software. In other implementations, the machine learning module can detect malware by analyzing the aggregated power consumption over relatively larger time windows (e.g., greater than 10 seconds). Infected target devices should consume more power when compared to clean target devices because the malware is performing additional computational tasks that require additional power of the target device's processor.

The method 200 can also include receiving a classification of the calculated features (step 210). Once the remote server detects the presence of malware (or unapproved software) executing on the target device, the remote server can transmit the classification to the monitoring device. In some implementations, the remote server can also transmit non-anomaly classifications to the monitoring device so the monitoring device can present the user with a "clear" status check to indicate that the monitoring device is working and has not detected the presence of anomalies. The results of the classification by the remote server (or monitoring device when classification is performed there) can be transmitted to a user device. For example, the results may be transmitted to a status monitoring application executing on the smart phone of a user. In some implementations, the server can also store the detection and classification information in an event database on the server or transmit the information to a remote event database.

Responsive to receiving a classification of the features as an anomaly, the monitoring device generates an alarm signal (step 212). The alarm signal may generate an audible or visual alarm. The alarm signal may also be transmitted to a user's mobile device in the form of a push notification, instant message, text message, email, or other alert.

CONCLUSION

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, Python, C, C++, C#, PROLOG, or in any byte code language such as JAVA. The software programs may be stored on or in one or more articles of manufacture as object code.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed:

1. A system, comprising;
a power supply receiving electric current from an alternating current (AC) source, and providing the electric current to a target device;
a monitoring component integrated with the power supply, the monitoring component comprising a sensor and one or more processors, wherein the sensor generates a signal corresponding to an amount of the electric current provided to the target device, and the one or more processors are configured to:
sample the signal generated by the sensor to create a plurality of current samples;
store the plurality of current samples in a data structure in a memory element of the monitoring component;
retrieve a subset of the plurality of current samples from the data structure stored in the memory element;
calculate a feature sample comprising at least one of a root-mean-square value or a skew value of the subset of the plurality of current samples;
transmit the feature sample to a remote server;
receive a classification of the feature sample from the remote server; and
generate an alarm signal responsive to the classification of the feature sample indicating an anomaly.

2. The system of claim 1, wherein the AC source is a wall outlet, and wherein the power supply is electrically coupled to a power cable configured to receive the electric current from the wall outlet.

3. The system of claim 1, wherein the monitoring component further comprises an analog-to-digital converter that receives the signal generated by the sensor and produces a corresponding digital signal; and
wherein the one or more processors are further configured to create the plurality of current samples by sampling the corresponding digital signal produced by the analog-to-digital converter.

4. The system of claim 1, wherein the sensor comprises at least one of a current-sense resistor, a current transformer, or a Hall-effect sensor.

5. The system of claim 1, wherein the monitoring component comprises at least one of an acoustic sensor or an electromagnetic sensor, and the one or more processors are further configured to:
receive a second signal from the acoustic sensor or the electromagnetic sensor;
sample the second signal to generate a plurality of second samples; and
generate the feature sample further based on at least one of the plurality of second samples.

6. The system of claim 1, wherein the one or more processors are further configured to calculate a frequency content for the subset of the plurality of current samples in each of a plurality of frequency bins.

7. The system of claim 1, wherein the one or more processors are further configured to calculate, as part of the feature sample, at least one of a mean, a variance, a kurtosis, or a standard deviation of the plurality of current samples.

8. The system of claim 1, wherein the one or more processors are further configured to:
receive an instruction from the remote server to increase a sampling rate at which the signal generated by the sensor is sampled; and
increase the sampling rate at which the signal generated by the sensor is sampled based on the instruction.

9. A system, comprising;
a target device receiving electric current from an alternating current (AC) source via a power supply;
a monitoring component integrated with the target device, the monitoring component comprising a sensor and one or more processors, wherein the sensor generates a signal corresponding to an amount of the electric current received by the target device, and the one or more processors are configured to:
sample the signal generated by the sensor to create a plurality of current samples;
store the plurality of current samples in a data structure in a memory element of the monitoring component;
retrieve a subset of the plurality of current samples from the data structure stored in the memory element;
calculate a feature sample comprising at least one of a root-mean-square value or a skew value of the subset of the plurality of current samples;
transmit the feature sample to a remote server;
receive a classification of the feature sample from the remote server; and
generate an alarm signal responsive to the classification of the feature sample indicating an anomaly.

10. The system of claim 9, wherein the AC source is a wall outlet, and wherein the target device receives the electric current from the wall outlet via the power supply.

11. The system of claim 9, wherein the monitoring component further comprises an analog-to-digital converter that receives the signal generated by the sensor and produces a corresponding digital signal; and
wherein the one or more processors are further configured to create the plurality of current samples by sampling the corresponding digital signal produced by the analog-to-digital converter.

12. The system of claim 9, wherein the sensor comprises at least one of a current-sense resistor, a current transformer, or a Hall-effect sensor.

13. The system of claim 9, wherein the monitoring component comprises at least one of an acoustic sensor or an electromagnetic sensor, and the one or more processors are further configured to:
receive a second signal from the acoustic sensor or the electromagnetic sensor;
sample the second signal to generate a plurality of second samples; and
generate the feature sample further based on at least one of the plurality of second samples.

14. The system of claim 9, wherein the one or more processors are further configured to calculate a frequency content for the subset of the plurality of current samples in each of a plurality of frequency bins.

15. The system of claim 9, wherein the one or more processors are further configured to calculate, as part of the feature sample, at least one of a mean, a variance, a kurtosis, or a standard deviation of the plurality of current samples.

16. The system of claim 9, wherein the one or more processors are further configured to:
receive an instruction from the remote server to increase a sampling rate at which the signal generated by the sensor is sampled; and
increase the sampling rate at which the signal generated by the sensor is sampled based on the instruction.

17. A surge protector with an integrated monitoring component, comprising:
a plurality of connectors each configured to provide electric current to at least one target device from an alternating current (AC) source;

a monitoring component comprising a plurality of sensors and one or more processors, wherein:

the plurality of sensors each correspond to a respective connector of the plurality of connectors, each of the plurality of sensors configured to generate a signal corresponding to an amount of the electric current provided by the respective connector; and the one or more processors are configured to:
- sample the signals generated by the plurality of sensors to create a plurality of current samples for each of the plurality of connectors;
- store the plurality of current samples for each of the plurality of connectors in a data structure in a memory element of the monitoring component;
- retrieve a subset of the plurality of current samples corresponding to a first connector of the plurality of connectors from the data structure stored in the memory element;
- calculate a feature sample comprising a root-mean-square value or a skew value of the subset of the plurality of current samples;
- transmit the feature sample to a remote server;
- receive a classification of the feature sample from the remote server; and
- generate, responsive to the classification of the feature sample indicating an anomaly, an alarm signal that identifies the at least one target device receiving the electric current from the first connector.

18. The surge protector of claim 17, wherein the AC source is a wall outlet, and wherein the surge protector is electrically coupled to a power cable configured to receive the electric current from the wall outlet.

19. The surge protector of claim 17, wherein the monitoring component further comprises one or more analog-to-digital converters that receive the signals generated by the plurality of sensors and produce corresponding digital signals; and wherein the one or more processors create the plurality of current samples for each of the plurality of connectors by sampling the corresponding digital signals produced by the one or more analog-to-digital converters.

20. The surge protector of claim 17, wherein the one or more processors are further configured to calculate a frequency content for the subset of the plurality of current samples in each of a plurality of frequency bins.

* * * * *